Figure 2:
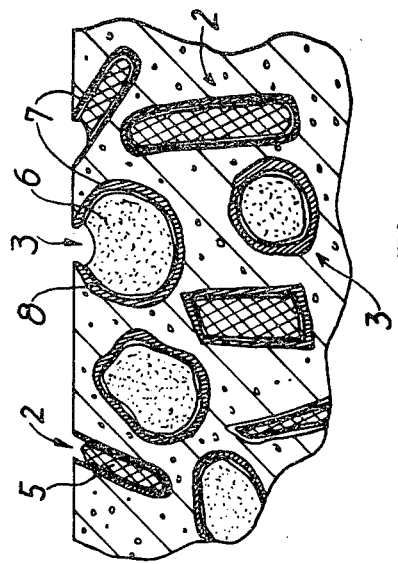

United States Patent [19]

Dubois

[11] 4,012,537
[45] Mar. 15, 1977

[54] DE-ICING COMPOSITIONS CONTAINED IN ROAD SURFACE MATERIAL

[75] Inventor: Robert Dubois, La Croix, Lutry, Switzerland

[73] Assignee: Plastiroute SA, Switzerland

[22] Filed: June 7, 1974

[21] Appl. No.: 477,338

[30] Foreign Application Priority Data

June 13, 1973 Switzerland .................... 8506/73
May 14, 1974 Switzerland .................... 6553/74

[52] U.S. Cl. .................. 427/138; 106/13; 106/273 R; 106/276; 252/70; 404/19; 404/20; 427/136; 428/403; 428/407

[51] Int. Cl.² .......................... C09K 3/18

[58] Field of Search ............ 404/19, 20; 427/136, 427/138; 106/13, 273 R, 276; 252/70; 428/403, 404, 407

[56] References Cited

UNITED STATES PATENTS

| 1,371,032 | 4/1919 | Kendrick | 252/70 X |
| 2,648,603 | 8/1953 | Jenin et al. | 427/136 |
| 2,967,466 | 1/1961 | Shoemaker et al. | 427/138 X |
| 2,978,351 | 4/1961 | Pullar | 428/403 |
| 2,979,463 | 4/1961 | Ferguson | 252/70 |
| 3,240,558 | 3/1966 | Heiss et al. | 252/70 UX |
| 3,310,494 | 3/1967 | Sproule et al. | 252/70 |
| 3,461,073 | 8/1969 | Crowell et al. | 252/70 |
| 3,507,686 | 4/1970 | Hagenbach | 252/62.1 |
| 3,855,167 | 12/1974 | Bowman | 427/136 |

FOREIGN PATENTS OR APPLICATIONS 433,957  8/1935  United Kingdom

OTHER PUBLICATIONS

Parade Magazine, Washington Post 11-9-75 "Iceless Road".

Primary Examiner—Mayer Weinblatt
Assistant Examiner—John D. Smith
Attorney, Agent, or Firm—Robert E. Burns; Emmanuel J. Lobato; Bruce L. Adams

[57] ABSTRACT

A composition for admixture with road surface preparation materials to prevent formation of ice and to melt snow on the finished road surface. The composition is distributed throughout the road surface and comprises particulate thawing substances at least some of which have a watertight coating resistant to the thawing substance and to the temperature at which the composition materials are prepared for application as a road surface. The coating may, however, be worn away by mechanical action, e.g. traffic movement, to expose the thawing substance.

8 Claims, 3 Drawing Figures

DE-ICING COMPOSITIONS CONTAINED IN ROAD SURFACE MATERIAL

The invention relates to a material for producing a road surface which prevents the formation of ice and melting snow, which road surface consists of a basic material, in particular of a material containing asphalt or a bituminous material and of additions of thawing substances.

It is known that slippery ice occurs at temperatures between +2° and 8° C, according to the relative humidity of the air. The heaviest snow falls likewise occur in this temperature range. Below −8° C, the humidity of the air is too low for precipitation on the road surface and the snow falls are scanty.

Heated road surfaces have already been used, in particular on bridges, for preventing the formation of slippery ice and coverings of snow, the heating being produced by electrical resistances embedded in the road surface or by means of pipes through which hot water flows. Arrangements of this type are naturally quite expensive and require energy which has to be supplied externally.

It is also customary to spread salt on the road surface, for example calcium or sodium chloride, which is very hygroscopic and lowers the freezing point of water.

However, the effect of spreading salt generally has a very short duration, since as they pass thereover, vehicles push the salt to the edge of the road and the water containing salt drains away from the road.

According to the present invention there is provided a de-icing composition for admixture with road surface preparation materials comprising particulate thawing substances at least some of which have a watertight coating, resistant to the thawing substance and to the temperature at which the admixed material is subjected for road surface application, but which coating may be mechanically destroyed to expose the thawing substance.

The particles provided with a covering, for example of linseed oil, are substantially protected from the effect of moisture and thus from decomposition until the covering has been mechanically destroyed or worn away; this mechanical action, by which the particle cores are opened to expose the thawing substances, is mainly produced by the normal abrasion of the road surface owing to traffic; thus, only the particles appearing on the surface of the road covering lose their covering on the upper side due to abrasion, so that the chemical thawing substance which is now exposed, is able to come into contact with the humidity of the air, rainwater or snow. Therefore, the particles originally located at a deeper point and which were hitherto protected, become successively effective in the same proportion as the thickness of the road surface is worn away, so that the thawing effect is maintained throughout the entire life of the road surface, at a practically uniform intensity.

The production of a material for use in the laying of a road surface is achieved simply by mixing the particles of the composition with the basic material at the construction site in a percentage adapted to the given geographic and climatic situation. This is advantageous because from case to case it is possible to adapt the proportion of additions in an optimum manner to the external conditions, which naturally depend on whether the road surface is laid on a bridge, in a section of woodland, in the mountains or on flat ground. Since, in most cases, for each section of road, one knows the average amounts of rain or snow to be expected seasonally and the temperatures as well as the permeability of the road covering used, in particularly of the bitumen used for water, the optimum proportion of additions may be calculated as a function of these conditions and the corresponding chemical substances used can be calculated with sufficient accuracy. For example, one knows that the temperature dependent coefficients of diffusion for bitumen always have the order of magnitude of approximately $1 \times 10^{-8}$ grams per centimeter thickness, per $cm^2$ surface, per hour and for a pressure difference of 1 mm mercury.

The composition preferably consists of a mixture with approximately 5 parts by weight sodium hydroxide, approximately 95 parts by weight calcium chloride and furthermore approximately 0.2 parts by weight calcium hydride; the hydroxide and chloride particles are provided with a covering, whereas the particles of calcium hydride, which promotes the dissociation of the water, even at low temperatures, have no covering.

Figure 1:
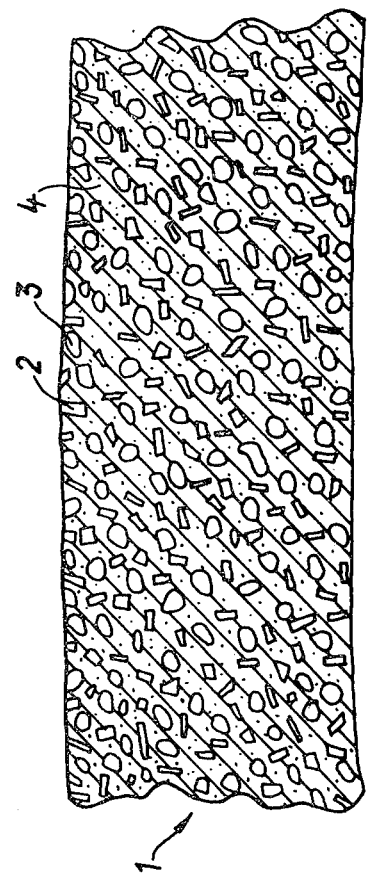
Figure 3:
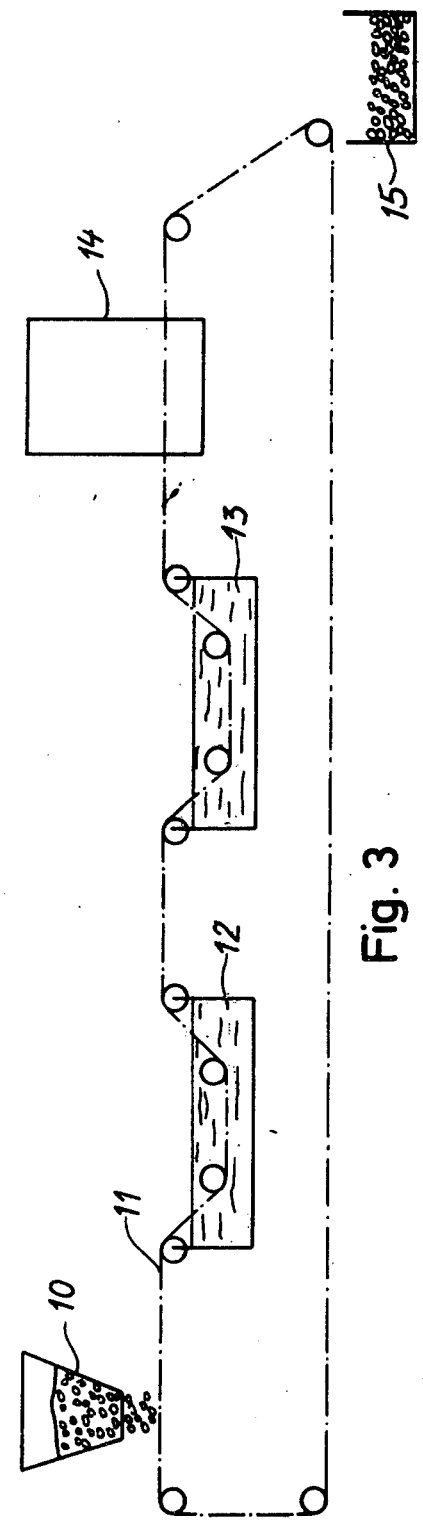

The invention is described by way of example only, with reference to one embodiment shown diagrammatically in the drawings:

FIG. 1 is a vertical section through a portion of the upper layer of a road surface produced with the composition according to the invention, FIG. 2 is an enlarged cut-away portion from FIG. 1, and FIG. 3 is a diagram to illustrate several operational stages during the production of the composition according to the invention.

In the example according to FIGS. 1 and 2, the upper layer 1 of a road surface produced with the composition according to the invention, whose thickness amounts to approximately 4 to 6 cm, contains three types of individual particles 2, 3 and 8, which are distributed uniformly in the basic material 4, for example an asphalt/sand mixture. These individual particles 2, 3 and 8 are mixed into the basic material before the production of the road surface, preferably directly at the construction site, so that then the finished mixed material may be laid in the normal manner and with conventional machines.

Each particle 2 of one type consists of a particle core, containing calcium chloride crystals 5 (FIG. 2) and of a tight covering 7 of linseed oil, preferably boiled linseed oil, surrounding the particle core. Each particle 3 of the second type consists of a particle core containing sodium hydroxide 6 and likewise of a tight covering 7 of linseed oil, preferably boiled linseed oil, surrounding the particle core. Each particle 8 of the third type consists of a calcium hydride particle and has no covering. All the particles are small in comparison to the thickness of the layer 1 and are either in the form of lozenges, flakes, beads or at least approximately spherical particles. The greatest dimension of the particles may be between approximately 2 to 10 mm, whereas the diameter of the at least approximately spherical particles may amount to between approximately 2 to 7 mm. In the example in question, the flake-like particles 2 have a length of approximately 5 mm. and a width or thickness of approximately 1 mm.

According to the geographic and climatic situation prevailing on the section of road to be laid, the proportion of particles forming the thawing additions may amount to between 2 and 7% by weight of the basic material 4. The weight ratio of calcium chloride to sodium hydroxide in the particle mixture amounts to approximately 15:1 to 20:1, whereas the proportion of calcium hydride with respect to the weight of the other substances forming the additions, is approximately between 0.15 and 0.3% by weight. The effect of the thawing chemical substances in the road surface is realised in the following manner.

It is known that roads with a medium to high traffic density are normally subject to abrasion, which reduces the thickness of the road surface by approximately 5 to 10 mm. per year. When the abrasion of the road surface begins, in the case of a number of particles embedded in the upper layer, the covering 7 is opened due to abrasion on the upper side, as shown diagrammatically in FIG. 2 and the particle core with the active substance comes into contact with the moisture contained in the air with rainwater or with snow. The highly hygroscopic sodium hydroxide or caustic soda thus undergoes dissolution which takes place in a highly exothermic manner and begins to melt the snow falling in the immediate vicinity. The water thus formed comes into contact with the calcium chloride, which is likewise highly hygroscopic, which is contained in the neighbouring particle cores likewise exposed by abrasion. The freezing point of the water is thus greatly reduced and water surfaces containing a great deal of salt begin to form around the small cavities in the road surface, in which calcium chloride crystals are contained, which water surfaces spread slowly over the entire road surface and effectively prevent any formation of slippery ice.

New particles which were originally located at a deeper level are continually appearing on the road surface and made effective by the exposure of their partial core, in the same proportion that the road surface is worn away by abrasion, so that the thawing capacity of the substances remains at a virtually constant intensity throughout the entire life of the road surface.

Since at least the major part of the particles still located below the road surface are surrounded substantially completely by a watertight covering 7 which is resistant with respect to the thawing substance, the particle cores of these particles embedded inside the road surface cannot be attacked or decomposed prematurely by moisture penetrating the road surface, so that their effectiveness is so to speak preserved until the abrasion of the road surface has reached a certain degree.

In addition since the only very small cavities, which are formed due to abrasion of the particle covering at the top of the road surface and due to partial disintegration of the particle core, have virtually quasi-capillary dimensions, in the case of high temperatures, which exclude the formation of snow or ice, i.e. particularly in summer, moisture or even heavy rain is prevented from quickly washing away the active particle cores, so that even the already exposed partial cores on the top of the road surface remain effective for a long time. Furthermore, the remaining salt in the cavities once more crystalizes as soon as the road dries, and is thus available for further reaction.

The choice of calcium chloride is based firstly on economic considerations, but this salt also has excellent properties for the desired purpose, since it greatly reduces the freezing point of water, provides an exothermic reaction, is very hygroscopic and at the time of drying re-crystalizes as a hydrate or mixed with water. Sodium hydroxide is likewise very favourable from the cost standpoint and with respect to its properties, in particular with respect to its development of heat of reaction and its hygroscopic behaviour. Furthermore, the chlorine liberated during the hydrolysis of the calcium chloride reacts with the sodium, which is produced during the hydrolysis of the sodium hydroxide, to form sodium chloride, which contributes to the reduction of the freezing point of water and absorbs the undesired free chlorine. Due to the choice of a mixture of calcium chloride particles and sodium hydroxide particles as the active thawing substances, i.e. using the resulting chemical reactions, a particularly protracted and continuous thawing effect is achieved.

This action is further increased by the addition of calcium hydride particles, since calcium hydride promotes the dissociation of water even at low temperatures.

Calcium bromide or calcium iodide or other suitable chlorides, bromides or iodides may be used as the thawing substances in place of the preferred calcium chloride, whereas other suitable hydroxides or hydroxide mixtures as well as other substances reacting exothermally under the action of moisture may be used in place of sodium hydroxide. Thus, calcium and other alkali earth metal hydroxides are suitable for example.

In principle, the formation of slippery ice and the formation of a coating of snow may be prevented by any known substances which react either exothermally or/and bring about dissociation of the water or/and reduce the freezing point of the water. The thawing action of the material to be mixed according to the invention may thus be basically achieved solely by using an appropriate salt; however, the appropriate addition of a substance which reacts in a highly exothermal manner or/and a substance promoting the dissociation of the water, in particular calcium hydride, increases and accelerates the desired effect.

Also, known solid freezing mixtures may be used as active thawing substances.

It is essential that the salt crystals and hydroxide particles are surrounded by a covering, in order that premature hydrolysis or reaction of the particles still embedded inside the road surface under the action of moisture penetrating the road surface is avoided. Therefore, this covering 7 must be water-tight and resistant to the chemical substance of the particle core as well as to the temperature of the material to be mixed, during its preparation for the purpose of application as a road surface; these temperatures may generally be 150° C as a maximum. A drying vegetable oil, in particular linseed oil, above all boiled linseed oil (so-called stand oil) has proved a particularly appropriate covering material; however, soya oil for example, may also be used.

In addition, suitable synthetic polymer materials may also be used as coverings, for example materials based on vinyl acetate, polyvinyl alcohol, epoxy resin or acrylic resin. Likewise, a suitable mineral oil derivative may be used as covering, which does not attack the bitumen of the basic material; a bitumen solvent is particularly suitable for this. In principle, substances which can be used as the covering, which are watertight and resistant to the thawing substances and to the preparation and laying temperatures of the mixed material, absorb little moisture and do not adhere after drying. According to the material, the thickness of the covering is several $10^{-3}$ to $10^{-1}$ mm.

FIG. 3 shows the preparation of the particles diagrammatically. For example, 94.5 to 95 parts by weight of calcium chloride crystals and 5 to 5.5 parts by weight sodium hydroxide particles are mixed in a storage vessel 10. A certain reaction between some particles to form sodium chloride and calcium hydroxide, which possibly takes place, is of no significance. By way of a conveyor belt 11, which is perforated or constructed as a seive, the mixture of particles passes from the storage vessel 10 to an oil bath 12, for example of linseed oil, through which the conveyor belt 11 with the particles located thereon is passed. Then, the excess oil is able to drip off; preferably, the conveyor belt is connected to a vibratory device which is not shown, which accelerates the drainage of oil and improves the distribution of the particles on the surface of the belt. The thickness of the layer of oil generally amounts to only several microns. To accelerate the drying of the oil covering, the conveyor belt 11 may then pass through a drying tunnel 13, which is provided with infra-red heating for example. However, a separate drying treatment of this type is not absolutely necessary. At the outlet of the drying tunnel 13, the particles coated with a layer of oil drop into a storage vessel 14 or mixer, in which they are uniformly mixed with calcium hydride powder. The proportion of calcium hydride preferably amounts to 0.2 parts by weight per 100 parts by weight of the original calcium chloride and sodium hydroxide mixture. The entire preparation operation takes place with the least possible humidity.

Instead of immersing the particles to be provided with a covering in an appropriate liquid bath, the particles may also be coated with the covering by spraying. For this purpose, the particles of substance to be provided with a covering, may be added to a mixer in the desired weight ratio, into which mixer the liquid covering material is then sprayed by means of nozzles or spray guns. The calcium hydride is then added in the desired amount.

The finished coated mixture of additives, which contains as additives about 5 parts by weight of sodium hydroxide, about 95 parts by weight of calcium chloride and about 0.2 parts by weight of calcium hydride, is then appropriately filled into suitable containers or bags and conveyed to the construction site, where these additives are added to the basic material of the mixture directly before the production of the road surface. During this mixing of additives in the basic material, a portion of particles may naturally be damaged or broken or the covering of a number of particles damaged. Likewise, during the laying of the mixed material, using conventional vibrators and rollers, the particles located on the surface may likewise be partially broken or damaged on their coverings, so that a certain proportion of particles whose inner active particle core is not completely protected by the covering, is already located on the top of the newly laid road surface. However, this is in no way a disadvantage, but on the contrary is desirable, in order that a certain thawing action is immediately effective on the new road surface. However, the major part of the particles embedded inside the road surface remains largely protected by the water-tight undamaged covering.

The total amount of thawing additives used and their mixing ratio depends mainly on the type and density of traffic and on the climatic conditions at the location of the section of road to be laid and, since the permeability of the road surface with respect to water and the other properties of the road surface are known, may be assessed with regard to an optimum effect.

If necessary, the particles provided with a covering may be surrounded by an inner oil layer, for example linseed oil or boiled linseed oil, and also by an external synthetic covering. For this, the particle cores are firstly immersed in an oil bath and then in a bath of liquid synthetic material or sprayed successively with oil and synthetic material.

What is claimed is:

1. An asphalt or bituminous based road surfacing material having dispersed therein 2 to 7% by weight of an ice-prevention and snow-thawing mixture of discrete particles of a calcium halide and an alkali metal hydroxide in the ratio of 15 to 20 parts by weight of halide for 1 part of hydroxide, said particles having a substantially water-tight coating which can be mechanically destroyed to expose said particles of the mixture.

2. A road surfacing material according to claim 1 in which the mixture is of between 15 to 20 parts of calcium chloride for 1 part of sodium hydroxide.

3. A road surfacing material according to claim 1 in which the mixture contains a trace quantity of particles of a substance which causes dissociation of water.

4. A road surfacing material according to claim 3 in which said substance is calcium hydride.

5. A road surfacing material according to claim 4, in which said mixture consists of between 15 to 20 parts by weight of calcium chloride, 1 part by weight of sodium hydroxide and approximately 0.04 parts by weight of calcium hydride.

6. A road surfacing material according to claim 5, in which said particles of calcium chloride and sodium hydroxide are coated with linseed oil, and said particles of calcium hydride are uncoated.

7. A road surfacing material according to claim 5, in which said particles of calcium chloride and sodium hydroxide are coated with a synthetic material selected from vinyl acetates polyvinyl alcohol, epoxy resin, acrylic resin and a mineral oil derivative which does not attack said road surfacing material, and said particles of calcium hydride are uncoated.

8. A method for preventing ice formation and for removing snow on a road surface, comprising preparing the road surface from a road surfacing material as claimed in claim 1.

* * * * *